(12) United States Patent
Judd et al.

(10) Patent No.: US 8,275,334 B1
(45) Date of Patent: Sep. 25, 2012

(54) REMOTE DETECTION OF ELECTRONIC DEVICES

(75) Inventors: Stephen L. Judd, Los Alamos, NM (US); Clifford M. Fortgang, Los Alamos, NM (US); David C. Guenther, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 839 days.

(21) Appl. No.: 12/421,623

(22) Filed: Apr. 9, 2009

Related U.S. Application Data

(60) Provisional application No. 61/123,697, filed on Apr. 9, 2008.

(51) Int. Cl.
*H04B 1/16* (2006.01)
(52) U.S. Cl. .............. 455/227; 455/41.2; 324/76.41
(58) Field of Classification Search ........ 455/41.1–41.2, 455/115.1–115.4, 140, 161.1–161.2, 165.1, 455/226.1–226.4, 227–228; 324/76.41–76.43
See application file for complete search history.

(56) References Cited

U.S. PATENT DOCUMENTS

| | | | | |
|---|---|---|---|---|
| 3,631,484 A | * | 12/1971 | Augenblick | 342/46 |
| 3,798,642 A | * | 3/1974 | Augenblick et al. | 342/42 |
| 7,864,107 B1 | * | 1/2011 | Lehtola | 342/146 |
| 8,131,239 B1 | * | 3/2012 | Walker et al. | 455/227 |
| 2004/0095243 A1 | * | 5/2004 | Holmes et al. | 340/572.2 |
| 2007/0152677 A1 | * | 7/2007 | Barsumian et al. | 324/533 |

* cited by examiner

*Primary Examiner* — Christian Hannon
(74) *Attorney, Agent, or Firm* — Samuel M. Freund; Cochran Freund & Young LLC

(57) ABSTRACT

An apparatus and method for detecting solid-state electronic devices are described. Non-linear junction detection techniques are combined with spread-spectrum encoding and cross correlation to increase the range and sensitivity of the non-linear junction detection and to permit the determination of the distances of the detected electronics. Nonlinear elements are detected by transmitting a signal at a chosen frequency and detecting higher harmonic signals that are returned from responding devices.

30 Claims, 2 Drawing Sheets

REMOTE DETECTION OF ELECTRONIC DEVICES

RELATED CASES

The present application claims the benefit of provisional patent application Ser. No. 61/123,697 entitled "Device for Detecting Electronics at Long Ranges" by Stephen L. Judd et al. filed on Apr. 9, 2008, which provisional application is hereby incorporated by reference herein for all that it discloses and teaches.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to detecting electronics utilizing solid-state junctions and, more particularly, to increasing the range and sensitivity of non-linear junction detection technology and providing range resolution thereto.

BACKGROUND OF THE INVENTION

Non-Linear Junction Detection (NLJD) is a well-known technique for detecting electronics that utilize semiconductor (solid-state) junctions. The current state of the art for finding hidden electronics such as electronic eavesdropping devices using this technology has a maximum range of about 2 m, and more typically between 6 in. and 12 in. A bare diode may be viewed as a dipole antenna having a nonlinear junction separating the two antenna elements. The response of a nonlinear junction to an applied voltage follows the IV curve for the junction, and may be described by $I=I_0(e^{qV/kT}-1)$ where q is the electronic charge, k is Boltzman's constant, T is the temperature of the device in Kelvin, V is the applied voltage, and I is the current flowing through the junction. The first two terms in the expansion of this expression are: $I=I_0(qV/kT+\frac{1}{2}(qV/kT)^2)$, the second term being responsible for generating the second-harmonic (doubled) frequency which is determinative of the RF radiation from the sought electronics. It is this frequency which is detected as an indicator of the presence a nonlinear or semiconductor junction associated with electronics. In the presence of a RF field, the voltage, V, is determined by the applied field (the transmitted power). When it exceeds the bias voltage, current I flows through the device and may be re-radiated. Because the current is a non-linear function of the applied voltage, the re-radiated energy contains harmonics of the fundamental applied RF frequency. In its simplest form, then, a nonlinear junction detector irradiates an area using frequency f, and detects returning electromagnetic radiation at frequency 2f (and possibly 3f, etc.).

Electronic devices typically contain multiple nonlinear junctions linked by wires or traces to other components. Therefore, energy may couple into and out of the device through multiple paths; moreover, the path(s) into a device may be different than the path(s) out of the device. It is to be noted that powering a device may alter its coupling characteristics (that is, biasing a diode of interest will place a signal farther up the IV curve).

A popular commercial device is the ORION (See, e.g., http://www.tscm.com/orion.html.). The ORION is effective, but has a range of only about 12 in. Simply increasing the transmitted power to several Watts with the hope of increasing the range for locating targets on the ground at several tens of meters has been found to be ineffective because of false positives (self-detection), low sensitivity, and severe attenuation of RF propagation along the ground.

Spread spectrum techniques are commonly used in communications, as they provide high sensitivity for low power requirements. Examples include cell phones (Code Division Multiple Access (CDMA)), and GPS (the latter uses a 50 W transmitter 20,000 km away). Pseudo-random encoding at the transmitter and cross-correlation at the receiver is used to detect and locate extremely weak signals, even in a noisy RF environment (this is how dozens of cell phones can work in close proximity without interfering with one another). Multiple techniques exist, including phase shift keying (PSK), frequency shift keying (FSK), amplitude shift keying (ASK), and the like.

SUMMARY OF THE INVENTION

Accordingly, it is an object of the present invention to provide an apparatus and method for increasing the sensitivity of non-linear junction detection measurements.

Another object of the invention is to provide an apparatus and method for increasing the range of non-linear junction detection measurements.

Still another object of the invention is to provide an apparatus and method for generating range information for non-linear junction detection measurements.

Yet another object of the invention is to provide an apparatus and method for discriminating among targets for non-linear junction detection measurements.

Additional non-limiting objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the apparatus for remotely locating solid-state electronics, hereof, includes in combination: an RF generator for generating a chosen frequency RF signal; a signal splitter for dividing the RF signal into a transmitted portion and a reference portion; a modulator for encoding a chosen code onto the transmitted portion of the RF signal; a controller for generating the chosen code, and for directing the code to the modulator; a power amplifier for amplifying the encoded RF signal; an antenna for transmitting the amplified, encoded RF signal; an antenna for receiving a similarly encoded second harmonic frequency of the encoded RF signal; a demodulator for receiving the second harmonic frequencies and the chosen code delayed by a selected time interval from the controller, and for removing the modulation from the second harmonic frequency; a frequency doubler for doubling the frequency of the reference portion of the RF signal; a mixer for comparing the doubled frequency of the reference portion of the RF signal with the demodulated second harmonic frequency, and for generating a DC signal if the doubled frequency of the reference portion of the RF signal is correlated with the demodulated second harmonic frequency; and a computer for receiving the DC signal, for directing the controller and for calculating distance between located solid-state electronics and the transmitting antenna.

In another aspect of the invention and in accordance with its objects and purposes the method for remotely locating solid-state electronics, hereof includes the steps of: generating a chosen frequency RF signal; dividing the RF signal into a transmitted portion and a reference portion; encoding a chosen code onto the transmitted portion of the RF signal; amplifying the encoded RF signal; transmitting the amplified, encoded RF signal; receiving a similarly encoded second harmonic frequency of the encoded RF signal; removing the encoding from the second harmonic frequency; doubling the frequency of the reference portion of the RF signal; comparing the doubled frequency of the reference portion of the RF signal with the second harmonic frequency for which the encoding has been removed; generating a DC signal if the doubled frequency of the reference portion of the RF signal is correlated with the second harmonic frequency for which the encoding has been removed; and calculating a distance between located solid-state electronics and the location of said step of transmitting the amplified, encoded RF signal.

Benefits and advantages of the present invention include, but are not limited to, sufficient performance enhancement that the apparatus will perform at distances of 100 m on the ground. Moreover, the manner in which detection is performed provides range information, thereby greatly increasing the ability to discriminate targets, as well as precisely locating targets.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Briefly, embodiments of the present invention include an apparatus and method for remotely locating solid-state electronics. Non-linear junction detection techniques (NLJD) are combined with spread-spectrum encoding and cross correlation to increase the range and sensitivity of the NLJD and to permit the determination of the distances of the detected electronics. Nonlinear elements are detected by transmitting a signal at a chosen frequency and detecting higher harmonic signals that are returned from responding devices. Spread-spectrum techniques including a hardware correlator increase sensitivity (decrease effective noise bandwidth). As will be set forth in detail hereinbelow, the present invention provides high sensitivity, wide dynamic range, and excellent clutter rejection/discrimination.

Primary applications of the present invention include, but are not limited to, detection of eavesdropping devices, and standoff (remote) detection of unusual electronics. For eavesdropping devices, the increased sensitivity of embodiments of the present invention allows for detecting a greater variety of devices, while the enhanced range allows for much more rapid sweeping of rooms; and the range resolution assists in the precise location of such devices. For electronics associated with suspicious packages, the appreciable standoff (remote) capability allows detection of such devices from safe distances, as well as the ability to establish the distance of the electronics.

As mentioned hereinabove, known difficulties encountered in nonlinear junction detection include:

a. Weak return signals: The conversion from the fundamental frequency which is incident on the target to a second harmonic (doubled) frequency is an inefficient and weak process and contributes to the short range of commercial NLJ Detectors. Propagation losses add to this problem since near the ground, RF propagates effectively as $1/r^4$ instead of $1/r^2$, giving rise to a substantial loss: for two-way propagation along the ground this implies that the difference between 1 m and 100 m is a factor of $10^{-16}$.

b. Detection in the presence of large signals: The transmitter may have a second harmonic component, though small, that masks the second harmonic being sought from a target; the transmitter fundamental may also generate a second harmonic signal in the NLJD electronics. Further, the transmitted power may enter the receiver along with any return signals. A large dynamic range permits the NLJD to detect both weak signals from distant targets simultaneously with strong signals from nearby targets.

c. High false-positive rate (rusted pipes are one commonly cited example). Unlike noise, which is random, "clutter" refers to deterministic, unwanted in-band signals, for example, from other transmitters such as nearby cell phones, or self-generated harmonics. Clutter leads to false positives in the detector, masking true positives.

Figure 1:
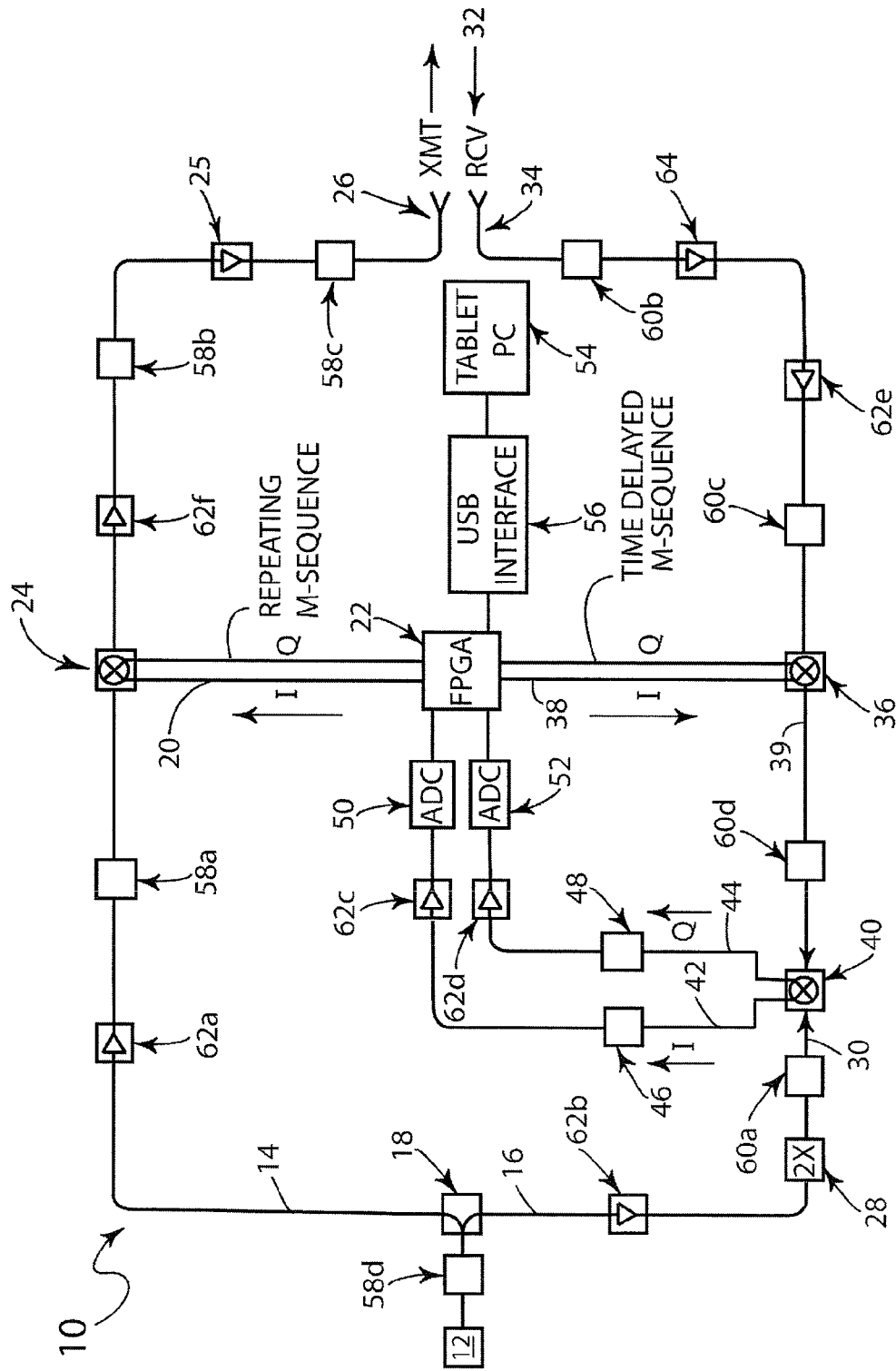
FIG. 1 is a block diagram illustrating the components of an embodiment of the apparatus of the present invention.

These problems, individually and in combination increase the difficulty of obtaining the desired measurements, and nonlinear junction detection has generally been considered to be a short-range technique. The present invention combines a transceiver architecture, transmitting at frequency f and receiving at frequency 2f, with modulating of the outgoing signal (using a pseudo-random spread spectrum code), and matching (cross-correlating) the return modulation at the receiver, as may be understood by referring to FIG. 1 hereof.

A spread-spectrum modulation code made up of chips having a chosen length is used to modulate the transmitted frequency. Each chip may be a −1 or +1. The code length may be varied. However, using longer code lengths may reduce, the effective noise bandwidth of the apparatus to provide increased sensitivity. Therefore, the code is essentially a series of +1's and −1's which appear to be random. An example of a 31-bit M-sequence is: −1 −1 −1 −1 1 −1 1 −1 1 1 1 −1 1 1 −1 −1 −1 1 1 1 1 1 −1 −1 1 1 1 −1 1 −1 1 1. Note the sequence is random and the sum of the bits is +1, which is a property of all M-sequences regardless of their length. The pseudo-random codes for the present invention were chosen to be M-sequences which may be generated in hardware using a Galois Linear Feedback Shift Register which is well known. The spread-spectrum modulation imparted to the RF signal is known as Binary Phase Shift Keying (BPSK). A +1 corresponds to a 0° phase shift and a −1 corresponds to a 90° phase shift. When the transmitted signal illuminates a semiconductor junction (electronics) the reflected (or scattered signal) is doubled in frequency, as discussed hereinabove, and the phase shift is similarly doubled. Therefore, a +1 still represents 0°, but the −1 now represents 180°. A 180° phase shift means the signal is inverted which is equivalent to multiplying it by −1. Thus, each received chip may be represented by either $A \sin(2\pi \cdot 2f_{xmit} t)$ if the chip is a +1 or by $-A \sin(2\pi \cdot 2f_{xmit} t)$ if the chip is a $-1$, where $2f_{xmit}$ is the frequency of the received signal.

Figure 2:
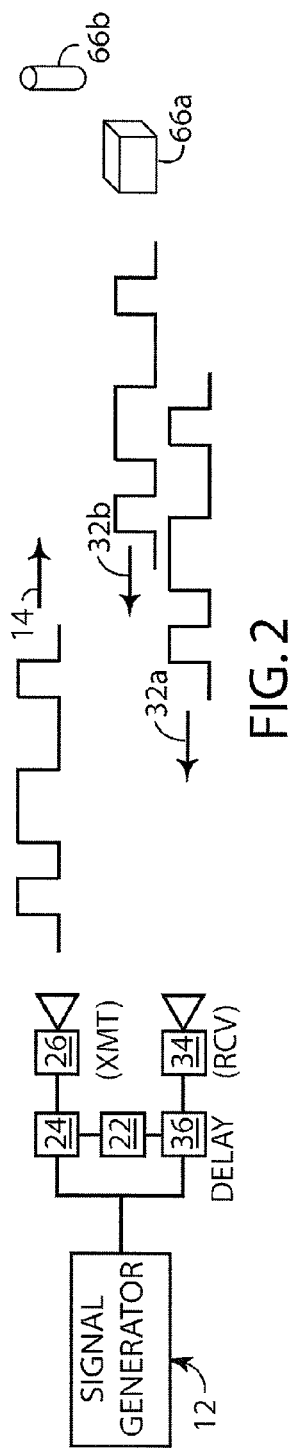
FIG. 2 is a schematic representation of an example of the time relationship between chips transmitted in a modulated RF signal and chips received from an electronics package upon which the RF signal is incident.

A time delay between when the coded signal is transmitted, and the time the return signal is received depends on the distance the detected electronics reflecting the signal are from the transmitter. A sample relationship between chips returning to the receiver and being transmitted is shown schematically in FIG. 2, hereof, where the RF signal, 32a, having twice the transmitted frequency of encoded RF signal, 14, is scattered from device, 66a, and the RF signal, 32b, having twice the transmitted frequency of encoded RF signal 14 is scattered from device, 66b.

The received signal is correlated with the transmitted signal in the following manner. A reference signal having the same pseudo-random encoding as the modulated transmitted signal is used to demodulate the received signal. The modulated transmitted signal is repeatedly generated and transmitted. The modulated signal consists of a chosen number of chips, and when all the chips are transmitted the sequence begins again and continues to repeat. The reference signal (which is the chip sequence) is delayed (shifted) by a chosen number of chips each time the transmitted signal is generated. The apparatus multiplies the received signal by the reference chips and adds the results. If the delay is incorrect such that there is no correlation among the chips, on average, 50% of the time a result of +1 is observed (from either 1×1 or −1×−1), and 50% of the time a result of −1 is observed (from either 1×−1 or −1×1). When the observed results are added, an approximate sum of zero results (actually −1 because of the odd number of chips). If the reference signal is appropriately delayed, all the −1's and +1's line up such that every one of the multiplications gives a result of +1 (either −1×−1 or 1×1). When the results are added, the final result is significantly larger than when the time delay is not correct.

In summary, when the correct delay is applied, the two signals are correlated and the resulting sum may be large, and a target is detected. The result of such correlation is equal to the number of chips, longer codes generating larger sums, whereas the result for uncorrelated signals is −1, independent of the code length. The ratio of the correlated result (the code length in chips) and the uncorrelated result (−1) is commonly called the processing gain.

Figure 3:
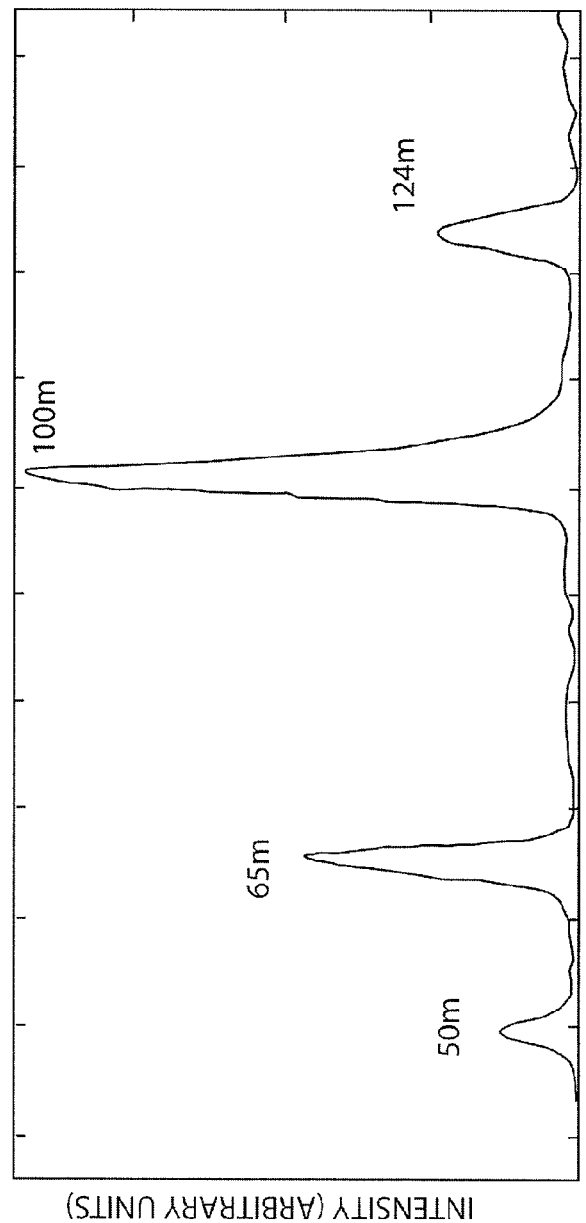
FIG. 3 illustrates processed signals received using the embodiment of the present apparatus described in FIG. 1 hereof from four electronic devices placed at different locations on the ground.

The delay applied to the reference modulated signal and which gave rise to the correlation may be used to calculate the distance of the target. Since the reference signal is delayed one-half chip at a time, the resolution in the distance to the target is determined by the distance associated with a single, half-chip. The ability to determine the range reduces the false positives which are common in conventional NLJDs. The principal sources of false positives were discussed hereinabove as being the second harmonic leakage from the transmitting antenna, and the detection of second harmonics by the apparatus from within the apparatus. Since these sources of false positive are located at the apparatus, they generally are detected with a delay of zero or one chip in the reference signal. If the minimum time delay is set to 2 or more chips, then the false positives in the immediate vicinity of the apparatus cannot be correlated and therefore cannot be "detected." Further, the correlation and time delay associated with the correlation process interrogates only a chosen range of distances at a time; therefore, large signals from nearby targets (which also may be false positives), do not mask weak signals from real, more distant targets. Thus, the ranging capability allows the present apparatus to separate weak signals from distant targets from strong signals of nearby targets, and the modulation permits the discrimination between a signal of interest and clutter generated elsewhere. With a transmitted power of 20 W, the embodiment of the present apparatus has consistently measured −155 dBm signals (with some averaging), post-antenna, representing a 198 dB spread. The invention has detected electronics at a distance of greater than 100 m which is well beyond the range of the existing technology. An example of an embodiment of the invention simultaneously detecting and locating four electronic devices dispersed on the ground is shown in FIG. 3 hereof.

The present apparatus may be mounted on a vehicle with directional transmitting and receiving antennas having fields of view tailored by both the antenna beam width and/or physical rotation of the antenna(s). The antennas would be directed to sweep both along and off to the sides of a road in the direction of forward of motion of the vehicle. Another application of the invention may be to mount the system on an elevated platform disposed on a post, at least 10 m high. The post might either be further mounted on a slowly moving platform or attached to the ground as a fixed post, and would continuously monitor a specific area. The apparatus might also be mounted on a moving platform with an extendable mast.

Reference will now be made in detail to the present illustrative embodiments of the invention, examples of which are illustrated in the accompanying drawings. It will be appreciated that in the development of actual embodiments, numerous implementation-specific decisions will perforce be made to achieve a developer's specific goals that will vary from one implementation to another. Moreover, it will be appreciated that such a development effort may be complex, but would nevertheless be a routine undertaking for those having ordinary skill in the art having the benefit of the present disclosure. In the FIGURES, similar structure will be identified using identical reference characters.

Returning now to FIG. 1, a block diagram of an embodiment of the present apparatus is illustrated. Apparatus, 10, includes an RF signal generator, 12, the output of which is divided into RF carrier signals, 14, and, 16, by splitter, 18. Chosen pseudo-random code (for example, a phase-shift-keying code), 20, generated by Field Programmable Gate Array (FPGA), 22, is impressed on signal 14 by quadrature phase modulator, 24, after which signal 14 is amplified by power amplifier, 25, and transmitted by transmitting antenna, 26 (XMT), which may be a directional antenna. Return signal, 32, is received by antenna, 34 (RCV), which may be a directional antenna, directed into quadrature phase demodulator, 36, driven by an identical, but time-delayed pseudo-random code, 38, from FPGA 22. Output, 39, of demodulator 36 is directed to mixer, 40. When the time-delayed code from FPGA 22 matches (correlates with) the modulation on received signal 32, output 39 of the demodulator is a sine wave having frequency which is doubled from that of the original carrier signal 14 and is equal to frequency, 30, exiting frequency doubler, 28. If the time-delayed code from FPGA 22 does not match the round trip delay of the received signal, then output 39 of demodulator 36 still has the modulation on it, indicating that the signals are uncorrelated. Mixer 40 down converts demodulator output 39. For the correlated case mixer output, 42, and, 44, is a low-frequency DC pulse, while for the uncorrelated case mixer output 42 and 44 contains the same high-frequency modulation that exited modulator 36. For the correlated case, the low-frequency pulse is passed without attenuation though low-pass filters, 46, and 48, and on to A-D converters, 50, and, 52. For the uncorrelated case, the high-frequency modulation is attenuated by low-pass filters 46 and 48 before being digitized by A-D converters 50 and 52. Some additional signal processing (integration) is performed by FPGA 22.

The output from FPGA is sampled at appropriate times by PC, 54, which both controls FPGA 22 and extracts and displays the target information from return signal 32 through interface, 56, which permits the cooperation of FPGA 22 therewith. Low-pass filters, 58a-58d, band-pass filters, 60a-60d, amplifiers, 62a-62f, and low-noise amplifier, 64, may be added to improve the apparatus response and reduce the generation of second harmonics.

As stated hereinabove, the correlation process may be mathematically expressed as multiplication and integration of the two signals; it may also be implemented by multiplication and filtering. The correlation process may be implemented in hardware (before digitization) or digitally (after digitization at the fundamental frequency). The latter method is more efficient (higher throughput), but has lower sensitivity and dynamic range which limits the maximum chipping rate. The present apparatus utilizes the digital spread-spectrum technique, but makes an analog measurement (I/Q phase, amplitude). This provides greatly increased sensitivity through background rejection, long integration times, and range resolution. Although phase shift keying (PSK) is employed, frequency shift keying (FSK) may be used individually or in combination therewith, and is supported by embodiments of the invention.

Codes having perfect or near-perfect correlation properties that may be used include M-sequences and derivatives such as Gold codes, Kasami sequences, and q-ary codes. The transmitted code is chosen such that, when doubled (or tripled, etc.) the returned signal is an M-sequence, q-ary sequence, etc.

Again referring to FIG. 1 hereof the method of the present invention may be understood as follows. A CW sine wave which may have a frequency between about 870 MHz and about 920 MHz due to bandwidth limitations is generated using a function generator. The bandwidth is limited by the bandwidth of the commercially available antennas and other RF components used in the apparatus. The signal is then divided, thereby preserving the exact frequency of the transmitted carrier signal for the receiver (mixer). The sine wave is amplified and filtered (to eliminate $2^{nd}$ harmonics that are inherent to the amplification process), and directed to the modulator. The modulator may be a digital (TTL) Quadrature-Phase (0°, 90°, 180°, and 270°) modulator, having two digital inputs labeled I and Q (In-phase and Quadrature phase, respectively). The truth table for the modulator is provided in the TABLE.

TABLE

| I | Q | Output Phase |
|---|---|---|
| 0 | 0 | 0° |
| 0 | 1 | 90° |
| 1 | 0 | 180° |
| 1 | 1 | 270° |

For the modulator employed, only 0° and 90° are used; thus, the I input is always LOW, the Q input being either HIGH or LOW. The state of the Q input is the M-SEQUENCE discussed hereinabove. Therefore, a sine wave exits the modulator having its phase modulated between 0° and 90° with the pseudo-random M-sequence. The length of the M-sequence and the frequency of the modulation or chip rate are chosen inputting these parameters into the FPGA through the USB port. The length of the M-sequence is typically $2^{10}-1$ (=1023) but may be chosen to be between $2^4-1$ (=15) to $2^{14}-1$ (=16383). The modulation (or chip) rate is also variable from as low as desired to about 100 MHz, but is typically 20 MHz. As explained hereinbelow, the error bar for assigning a range to a detected target is inversely proportional to the chip rate; that is, the higher the chip rate the more accurately a target can be located; therefore, very low chip rates are not useful.

The modulated signal exits the modulator, is again amplified and filtered, amplified using a high-power amplifier and again filtered, and transmitted. The modulated transmitted signal is repeatedly sent. When the M-sequence is completed (in the example hereinabove, 1023 chips), the process is repeated. Signals from responding electronics as a result of the non-linear junction phenomena are both doubled in frequency and phase compared to the RF exiting the transmitter. Thus, for example, if the transmitted signal is centered at 900 MHz with a 0° and 90° phase shift modulation at 20 MHz, as an example, then the scattered signal is centered at 1800 MHz with a 20 MHz phase shift modulation of 0° and 180°. Note that the modulation rate of the scattered signal does not double to 40 MHz. The received signal (from a second antenna) is first amplified using a low noise amplifier, and again with another amplifier before entering the demodulator which has the same truth table as the modulator except now the two states used are 0° and 180°. Referring to the TABLE, the Q input is held LOW and the I input changes between LOW and HIGH. The manner in which the I input to the demodulator changes is again the M-sequence. The M-sequence that is directed to the demodulator (I input) is the same as that which was directed into the modulator (Q input), except that the M-sequence going to the demodulator is delayed relative to that which was directed to the modulator.

This delay has several consequences. The delay time increment is equal to ½ a chip. For example, if the chip rate is 20 MHz, the delay increment of the M-sequence to the modulator is 25 ns (=0.5·1/(20 MHz)). An operator using the computer graphical user interface, or GUI, through the USB interface instructs the FPGA to set a minimum and maximum delay. The delay can be expressed in one of three ways: (1) the number of chips; (2) time; or (3) range to the target. Range is often the most useful to the user. Range=$c·t_{delay}/2$, where c is the speed of light. When a target is detected, the distance to the target is calculated from this equation where $t_{delay}$ is the time delay that produced the correlation. The minimum range is usually set to at least about 5 m since electronics associated with the apparatus will be detected if the minimum range is set too low. The maximum range is generally less than about 100 m because the signals coming from targets further than 100 m are often too weak to detect. Therefore, typical minimum and maximum distances are between about 5 and about 100 m, although these distances may be contracted or expanded depending on the application intended.

The apparatus is designed to detect electronics in the direction the antennas are pointed because high-gain antennas having a relatively narrow beam are typically employed. The range of detection is stepped through from the minimum to the maximum in half-chip increments. A range increment is equal to $c·T_{half-chip}/2$, the factor of ½ arising because the signal makes a round trip. $T_{half-chip}=½×(1/\text{chip rate})$; therefore, as an example, if the chip rate is 20 MHz, then $T_{half-chip}=25$ ns and the range increment is 3.75 m. Typical operating conditions might include: 1000 chips, 20 MHz chip rate, minimum range=30 m, the maximum range is 100 m, and the range increment is 3.75 meters. For 1000 chips in a M-sequence, it takes 1000×50 ns=50 µs to interrogate a single range bin. There are (100−30)/3.75=~19 bins to be interrogated which takes 50 µs×19=950 µs to scan from 30 m to 100 m. Because the system is fast (typically 1 ms to scan the desired range) a user may request an Averaging Mode where the entire range is scanned N times and the average value for each range bin is displayed. This is especially useful for weak signals, because averaging increases the Signal-to-Noise ratio. Also, regarding range accuracy, as explained hereinabove, the accuracy of locating a given target is determined by the range increment which in turn is determined by how fine the time delay is. The smaller the time-delay step the higher the accuracy. A time-delay step of one-half chip at a time is typical, but the time delay can be smaller if desired so that the accuracy of locating a detected target is less than 1 m. The finer the time delay, the higher the accuracy, but the time it takes to scan a given range is increased because the number of range bins is increased.

At the demodulator, the incoming signal is a pseudo-random bi-phase (0° and 180°) modulated signal. The purpose of the demodulator is to "strip off" the modulation if the signal is coming from a target that is located at the range being interrogated. When the signal is coming from the range being interrogated, the M-sequence on the received signal will exactly match the delayed M-sequence coming from the FPGA. For this situation, a sine wave at exactly twice the frequency produced by the signal generator exits the modulator. This is what is meant by the signals being "correlated." If there is no target at the range being interrogated, then the M-sequence on the received signal does not match up with the delayed M-sequence from the FPGA, and a doubled carrier signal that is still phase modulated with a pseudo-random sequence exits the demodulator. For this situation, the two signals are uncorrelated.

The mixer is an analog device (all 4 ports), whereas the described modulator and demodulator are digital devices, and down converts the signal from the modulator. Further, I and Q for the mixer are outputs not inputs as for the modulator and demodulator. One input is a sine wave at double the frequency which was used for the transmitted carrier signal, and is generated by the doubler labeled. If there is correlation from the demodulator, the demodulator produces a sine wave having twice the transmitted frequency. For the situation where there is correlation, two sine waves enter the mixer. These two sine waves are at exactly the same frequency, but do not necessarily have the same phase. For the correlated situation a DC level from the I and Q ports exits the mixer. The exact proportion of I and Q depends on the phase between the two sine waves. Of importance is that there is a DC level at either I or Q or both for as long as there is correlation. For the example parameters provided hereinabove, it takes 50 µs to interrogate a single range bin, and there will be a step pulse of constant amplitude for 50 µs duration. The frequency content of the pulse is ~1/code length=1/50 µs=20 kHz. Note the frequency content of the correlated signal exiting the mixer (20 kHz) is much lower than the modulation frequency (20 MHz). In fact, it is lower by a factor equal to 1/number of chips (1000 for this example). If there is no correlation, the signal emerging from the mixer no longer has the 1800 MHz carrier because of the down conversion, but still has the pseudo-random modulation on it. It is a noisy pseudo-random signal having a bandwidth equal to the chip rate. For the present example, it will appear to be random white noise out to about 20 MHz.

The mixer output is filtered by a low pass filter which passes the low-frequency correlated signal, but not the high-frequency uncorrelated signal. If there is correlation, a "pulse" having 50 µs duration exits the low pass filter. If there is no correlation, then a small quantity of pseudo-random noise exits the low pass filter. This small amount of noise has an average value of 0 volts. The I and Q signals out of the mixer are amplified, digitized and directed into the FPGA. Typically, the digitizer has a digitizing rate of about 1 MHz, but may be higher. The FPGA is synchronized to the digitizer in order to identify which samples are associated with which range bin. At 1 MHz sampling and M-sequences that are 1000 chips and therefore 50 µs long (for a 20 MHz chip rate) there are therefore 50 samples/range bin. If the signal is correlated, then there is a DC pulse exiting from the mixer, through the low pass filter, and after digitization, into the FPGA. The FPGA integrates (or adds) the samples (for both I and Q separately) over the 50 µs which produces a result that is 50 times the amplitude of the DC pulse. If the signal is not correlated, then there is random high-frequency noise exiting the low pass filter that is being digitized. The noise is sampled 50 times, has + and − values, and the result after integration is close to zero, or at least much smaller than the correlated value. This process is performed separately for both I and Q, and for each range bin there is a SUM I value and a SUM Q value. For each range bin the single number that is passed to the user for display at the computer is Range Bin Magnitude=SQRT[(SUM I)$^2$+(SUM Q)$^2$], and if there is a detected signal from any particular range bin it appears as a peak at that range bin. FIG. 3 is an example where 4 targets at 4 having different range bins were detected.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for remotely locating solid-state electronics, comprising in combination:
   an RF generator for generating a chosen frequency RF signal;
   a signal splitter for dividing the RF signal into a transmitted portion and a reference portion;
   a modulator for encoding a chosen code onto the transmitted portion of the RF signal;
   a controller for generating the chosen code, and for directing the code to said modulator;
   a power amplifier for amplifying the encoded RF signal;
   an antenna for transmitting the amplified, encoded RF signal;
   an antenna for receiving a similarly encoded second harmonic frequency of the encoded RF signal;
   a demodulator for receiving the second harmonic frequency and the chosen code delayed by a selected time interval from said controller, and for removing the modulation from the second harmonic frequency;
   a frequency doubler for doubling the frequency of the reference portion of the RF signal;
   a mixer for comparing the doubled frequency of the reference portion of the RF signal with the demodulated second harmonic frequency, and for generating a DC signal if the doubled frequency of the reference portion of the RF signal is correlated with the demodulated second harmonic frequency; and a computer for receiving the DC signal, for directing said controller and for calculating distance between located solid-state electronics and said transmitting antenna.

2. The apparatus of claim 1, wherein said modulator and said demodulator comprise quadrature phase modulators.

3. The apparatus of claim 2, wherein the chosen code is imparted to the transmitted portion of the RF signal by binary phase shift keying spread-spectrum modulation.

4. The apparatus of claim 3, wherein the code is chosen from M-sequences, Gold codes, Kasami sequences, and q-ary codes.

5. The apparatus of claim 3, wherein the binary phase shift keying spread-spectrum modulation has a modulation frequency of less than about 100 MHz.

6. The apparatus of claim 1, wherein said chosen code is imparted to the transmitted portion of the RF signal by frequency shift keying spread-spectrum modulation.

7. The apparatus of claim 1 wherein said controller comprises a field programmable gate array.

8. The apparatus of claim 1, wherein said transmitting antenna is a directional antenna.

9. The apparatus of claim 1, wherein said receiving antenna is a directional antenna.

10. The apparatus of claim 1, wherein said transmitting antenna and said receiving antenna are disposed on a movable vehicle.

11. The apparatus of claim 1, wherein said transmitting antenna and said receiving antenna are disposed on an elevated platform.

12. The apparatus of claim 1, wherein said chosen frequency is between about 870 MHz and about 920 MHz.

13. The apparatus of claim 1, further comprising at least one RF filter for reducing interference of harmonics of the chosen frequency generated in said apparatus.

14. The apparatus of claim 1, wherein the DC signal is averaged over a selected number of cycles of said apparatus.

15. The apparatus of claim 1, further comprising a low-noise amplifier for amplifying the encoded second harmonic frequency of the encoded RF signal received by said receiving antenna.

16. A method for remotely locating solid-state electronics, comprising the steps of:
generating a chosen frequency RF signal;
dividing the RF signal into a transmitted portion and a reference portion;
encoding a chosen code onto the transmitted portion of the RF signal;
amplifying the encoded RF signal;
transmitting the amplified, encoded RF signal;
receiving a similarly encoded second harmonic frequency of the encoded RF signal;
removing the encoding from the second harmonic frequency;
doubling the frequency of the reference portion of the RF signal;
comparing the doubled frequency of the reference portion of the RF signal with the second harmonic frequency for which the encoding has been removed;
generating a DC signal if the doubled frequency of the reference portion of the RF signal is correlated with the second harmonic frequency for which the encoding has been removed; and
calculating a distance between located solid-state electronics and the location of said step of transmitting the amplified, encoded RF signal.

17. The method of claim 16, wherein the code in said step of encoding the chosen code is imparted to the transmitted portion of the RF signal by binary phase shift keying spread-spectrum modulation.

18. The method of claim 17, wherein the code is chosen from M-sequences, Gold codes, Kasami sequences, and q-ary codes.

19. The method of claim 17, wherein the binary phase shift keying spread-spectrum modulation has a modulation frequency of less than about 100 MHz.

20. The method of claim 16, wherein the code in said step of encoding the chosen code is imparted to the transmitted portion of the RF signal by frequency shift keying spread-spectrum modulation.

21. The method of claim 16, wherein said step of transmitting the amplified, encoded RF signal is performed using a directional transmitting antenna.

22. The method of claim 16, wherein said step of receiving an encoded first harmonic frequency of the encoded RF signal is performed using a directional receiving antenna.

23. The method of claim 21, further comprising the step of disposing the directional transmitting antenna on a movable vehicle.

24. The method of claim 22, further comprising the step of disposing the directional receiving antenna on a movable vehicle.

25. The method of claim 21, further comprising the step of disposing the directional transmitting antenna on an elevated platform.

26. The method of claim 22, further comprising the step of disposing the directional receiving antenna on an elevated platform.

27. The method of claim 16, wherein the chosen frequency is between about 870 MHz and about 920 MHz.

28. The method of claim 16, further comprising the step of filtering for reducing interference of generated harmonics of the chosen frequency.

29. The method of claim 16, further comprising the step of averaging the DC signal over a selected number of cycles of said method.

30. The method of claim 16, further comprising the step amplifying the similarly encoded second harmonic frequency of the encoded RF signal.

* * * * *